Patented Oct. 26, 1937

2,097,143

UNITED STATES PATENT OFFICE 2,097,143

METHOD OF FORMING MARSHMALLOWS

Edwin N. Campbell, Waukesha, Wis.

No Drawing. Application December 23, 1935,
Serial No. 55,835

5 Claims. (Cl. 99—134)

This invention appertains to foods and ingredients of foods, and more particularly to a novel method of preparing marshmallows to facilitate the use thereof.

Marshmallows are well known as an article of food and are extensively used in salads, desserts, candies, hot chocolate, etc. However their use has been somewhat restricted, due to the form thereof and the fact that the same are of a soft sticky nature, which hinders the cutting up thereof in a desired size, both by the manufacturer and consumer. Thus, the use of marshmallows would be more general if they could be obtained ready-cut to a size most convenient for consumption.

It is, therefore, one of the primary objects of my invention to provide a novel method and process for treating marshmallows during the manufacture thereof, whereby the same can be readily formed in a size most suitable for consumption without necessitating the cutting up thereof.

Another salient object of my invention is the provision of means for rendering the batch of marshmallow at the factory temporarily brittle, whereby the same can be readily broken up into fragments, with means for grading the fragments, so as to permit the packaging of a desired size.

With these and other objects in view, the invention consists in the novel method and process, as will be now more particularly described.

In accordance with my invention, the batch of marshmallow is made up in the ordinary manner at the factory and is taken directly from the beater and placed in a low temperature room or in a refrigerator. The batch of marshmallow is left until the same is frozen solid. When this condition has been reached the frozen batch of marshmallow is removed from the cold room and immediately broken up into fragments by any suitable machine. While still in its cold state, the broken fragments are passed over a screen of about one-half inch mesh. The part that goes over the screen is of the size desired, and the same is placed in corn starch for several hours to thaw out and to absorb some moisture.

After the desired time has elapsed the marshmallow is removed from the starch and the same has the appearance of being cut, and the marshmallows are about one-half inch to five-eighths inch of an irregular size and shape. These pieces are not affected by their cold treatment at all and are found to be soft and tender and just of the right size for the various uses to which they may be applied. These fragments of the desired size are packaged in any desired manner and will keep indefinitely in cellophane bags or in tin cans.

The marshmallow pieces which fall through the screen are allowed to thaw out and adhere together, after which the same are again frozen and treated in the manner described above.

From the foregoing description it can be seen that I have provided an exceptionally simple and effective method for handling a batch of marshmallow to obtain pieces of the desired size without necessitating the cutting up of the batch by knives and the like.

Changes in details may be made, but what I claim as new is:

1. The process of forming marshmallows into a desired size for use by the trade, which consists in taking a batch of marshmallow from the beater, subjecting the same to a low temperature until frozen, breaking the frozen batch into fragments, and then grading the fragments to obtain a desired size.

2. The process of treating marshmallow to obtain a desired size suitable for use by the trade, which consists in making up a batch of marshmallow, taking the batch directly from the beater and subjecting the same to a low temperature until frozen solid, breaking up the frozen mass into small fragments, passing the fragments over a grader screen, and packaging the fragments passing over said screen.

3. The process of treating marshmallow to obtain a desired size suitable for use by the trade, which consists in making up a batch of marshmallow, taking the batch directly from the beater and subjecting the same to a low temperature until frozen solid, breaking up the frozen mass into small fragments, passing the fragments over a grader screen, packaging the fragments passing over said screen, allowing the fragments passing through the screen to thaw out and adhere together, and re-subjecting the adhered mass to low temperature and the breaking-up process.

4. The process of forming marshmallows into a size suitable for use by the trade, which consists in first mixing up a batch of marshmallow, subjecting the made-up batch to a low temperature until frozen solid, breaking up the frozen mass into small fragments, grading the broken fragments to obtain a desired size, thawing out the selected size in corn starch, and finally removing the fragments from the corn starch for sale.

5. The process of forming marshmallows in a size suitable for use by the trade, which consists in first making up a match of marshmallow, rendering the batch temporarily brittle by freezing, and then breaking up the batch into fragments while in its brittle condition.

EDWIN N. CAMPBELL.